May 10, 1932.  W. BOKENKROGER  1,857,348
FILTER FOR GASEOUS SUBSTANCES
Filed May 14, 1928
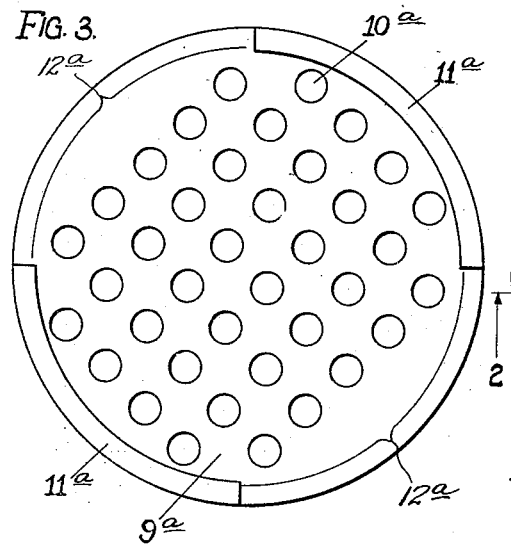
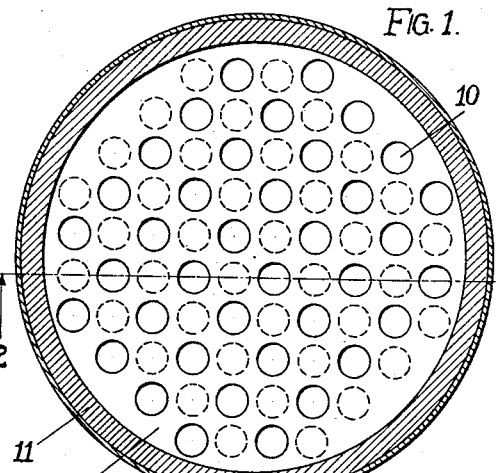
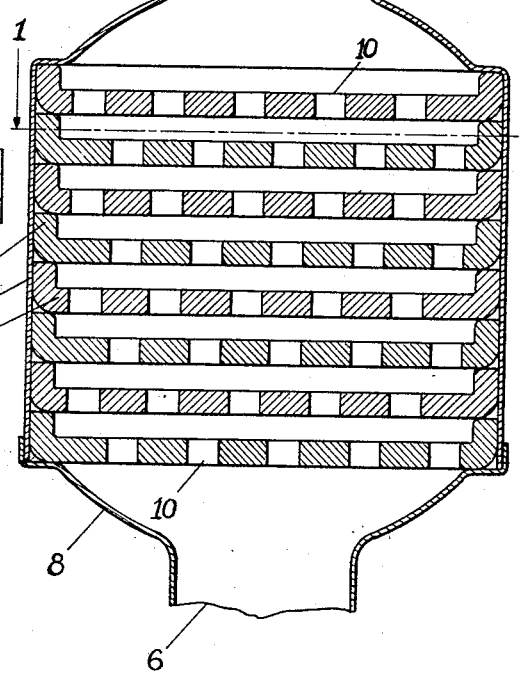
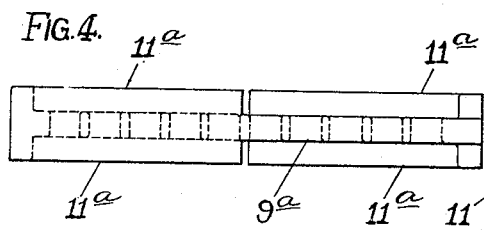
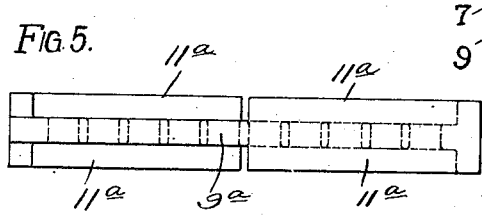
INVENTOR
William Bokenkroger
BY Rudolf Wildermann
his ATTORNEY Patented May 10, 1932

1,857,348

UNITED STATES PATENT OFFICE

WILLIAM BOKENKROGER, OF EDGEWATER, NEW JERSEY

FILTER FOR GASEOUS SUBSTANCES

Application filed May 14, 1928. Serial No. 277,432.

My invention relates to filters for gaseous substances, particularly air, in connection with the innumerable instances of industrial application such apparatus has found during these last years. The objects of my invention are to provide a gas filter which, first, is easily inserted in, or attached to the end of, a conduit; second, does not impair the flow of the gas; third, has means for bringing all parts of the gas into cleansing contact with the filter; fourth, exposes the whole filter to the flow of the gas; fifth, consists of a fixed arrangement which is not subject to any change in respect to its resistance to the flow of the gas; sixth, has means for the preservation of its moisture; seventh, has means for regenerating the absorptive quality of the exposed filtering parts; eighth, can readily be taken apart for cleaning; ninth, can at any time be restored to its original efficiency by the replacement of simple, inexpensive parts; tenth, has means for fool-proof alignment of the replacement parts.

I attain these objects by the type of a device illustrated in the accompanying drawings in which:

Figure 1 is a sectional top view of my device.

Figure 2 is the corresponding sectional elevation.

Figure 3 is a top view of the filtering part, showing a slight variation from the one of Figures 1 and 2.

Figure 4 shows the side elevation of same.

Figure 5 is the corresponding front elevation of the part.

Similar numerals refer to similar parts throughout the various views.

The inlet and outlet 6 of my device may be provisions to connect, by any of the methods commonly known, to a gas or air conduit. On the air intake of an internal combustion engine I may, for instance, provide in these places, flanged couplings which by gaskets are secured between the tubes connecting to the carburetor or vaporizer. One of these openings forms part of the container 7, the other one forms part of the cover 8 of my device. These parts may be assembled to each other by push fit, or they may have a threaded or flanged fitting, or a spiral lock, or any of the many means of connection known to this art.

The filter members 9 are made of an absorbent material such as felt, soft card board, pumice or any other porous material suited for binding dust or other small particles of substances, when kept moist. These filters 9 are provided with perforations 10 and on their circumferences they show the rims 11 which space them against each other.

As evident from the drawings, adjacent filters are alternatingly shifted in respect to each other for 90°, so that the holes in each filter overlie the solid spaces between holes upon the adjacent filters. A staggered arrangement of the passages throughout the various filters is thus provided and the gas is whirled about and all of its parts are brought into contact with the filters on passing through my device.

Figure 3 shows a slight change in the construction of my filters; whereas the perforations $10^a$ in the filter member $9^a$ are corresponding to those of the filters of Figures 1 and 2, the rim part $11^a$ is not carried around the full periphery of the filter, but consists of two 90° sectors which face each other on opposing sides, whereas the 90° space $12^a$ between these sectors $11^a$ does not have any rims. It is also noticed that corresponding rim sectors $11^a$ are provided on both the top and bottom of the filter members. If we turn the side view of Figure 4 of this filter through 90°, it has the appearance of Figure 5; and in a top view corresponding to Figure 5 the perforations $10^a$ would correspond to the dotted perforations of Figure 1. It is evident that when the parts of Figures 4 and 5 are brought together, rims $11^a$ interlock, so that the center parts are respectively spaced apart in substantially the same way as the center parts of the filters in Figure 2. Therefore a series of filters like Figure 3 will be readily assembled to form a filter arrangement with the holes $10^a$ in staggered relation to each other in the manner of Figure 2.

Whereas it is necessary to provide means to retain my improved filters in the path of the flow of the gaseous substances to be filtered, it is not necessary that the means serving for this purpose take the shape of the container 7, the cover 8 and the adjacent inlet and outlet 6 in the drawings. It is readily seen that my filters may be directly inserted in any conduit conducting the gaseous substances, provided, first, the filters are shaped to fit into said conduit; second, the conduit is of such size that the restriction of the passage due to the filter does not cause undue resistance for the flow of the gaseous substances; third, there are some means in said conduit to support the first and last filter in coaxial direction. Apparently the last requirement must be specially provided for, because it is not ordinarily found in a conduit. But I easily can provide in a conduit a slight shoulder against which rests the first of my filters, and a recess may be provided next to the last one of my filters into which a tensile expansion ring may be snapped after the filters have been arranged in position. This arrangement seems to be the most simple means to attain the above purpose but, of course, there are known to the mechanical arts many other ways to reach the same end.

Whereas in the drawings I attain the object of opening the filters at a suitable distance, by rims protruding from the plane of said filters around their circumference, there are many other ways by which I space the filters at the desired distances from each other. Suitable protrusions in the shape of lugs or ribs may be provided anywhere on the face of the filters and take the place of the protruding rims, or, without making the filters thicker at any point of its plane, I may shape said filter members in such a way that each provides for the proper spacing against the adjacent ones. I may, for instance carry through the latter way of constructing my filters by corrugating them,—the same way as sheet metal may be corrugated,—the overall thickness of the corrugated filter being the same as the distance between the corresponding points of adjacent filters in the method of execution illustrated in the drawings. In that case, I shall resort to a transverse arrangement of the corrugations of adjoining filters, and shall preferably have means to retain adjacent filters with the corrugations at right angles to each other.

It is further understood that I do not want to limit myself to the shape of round holes for the perforations in the filters; but such perforations may have the shape of squares, slots, sectorial or segmental openings, providing the essential part of my invention, i. e., the feature of having the openings in each filter face solid parts of the adjacent filters, is maintained throughout.

I make my filters of an essentially homogeneously porous structure throughout. The porous material is molded or otherwise suitably fashioned to the desired shape, or materials of a fibrous or hairy structure may be pressed into that shape, a suitable binder being used if necessary. The finished filters are self-supporting and will normally retain their shape indefinitely. The material comprising the filter member is such that the liquid used does not cause dissolution or a distortion of the shape of the filter.

I choose the material and thickness of the filters so as to provide sufficient space in the porous structure to retain an adequate amount of the liquid which I coat over said filter members and impregnate therein, and utilize to bind the impurities in the gas as it flows over the face of said filter. Of course, the passage of the gas will cause evaporation of some of that coated and impregnated liquid, and the required moisture of the surface of the filter is restored by diffusion of the liquid in the pores of said filter, its circulation in the body of the filter members, and its flow to the filter surface. Likewise the diffusive qualities of the liquid used must be such as to allow the material removed from the passing gas by adhesion to the moist surface of the filters or, to the moisture on said surface, to be carried to the inside of said filter by the diffusion. The liquid which I have found most suitable for the purpose of carrying through my invention are oils of low vapor tension, which are so uniform in that respect as practically can be provided for.

By the provision of filter members of this porous character, which are so impregnated with a dust gathering liquid that they will, for a long period, without reimpregnation, present a moist surface to the passing dust laden gases, and which permit a circulative movement of this dust gathering liquid through the porous body of these filter members, I not only provide a means by which the filter members will effectually filter the passing gases, but I provide also a type of filter member, which, as the result of this circulation, will automatically so purify the dust laden liquid with which it is coated, that, in the process of circuation through the body of these filter members, this liquid itself is repurified, to be again automatically diffused to the surface of these filter members, in a substantially originally pure condition, for reuse.

I claim:

1. A device of the character described comprising a tubular container, said container being contracted at one end, detachable retaining means on the other end of said container, a plurality of perforated porous plates saturated and coated with a fluid dust binding substance stacked in said container between said contracted end and said retaining means, and rims forming a unit with each of said plates projecting therefrom, positioning adjacent plates in predetermined spaced relation to each other.

2. A device of the character described comprising a tubular container, said container being contracted at one end, detachable retaining means on the other end of said container, a plurality of porous plates stacked in said container between said contracted end and said retaining means having a series of perforations formed in the bodies of said plates, and complementary sectorial rims forming a unit with each of said plates, on opposite sides thereof, locating said plates in spaced relation to each other so that the perforations of each of said plates face solid parts of said bodies of the adjacent plates.

WILLIAM BOKENKROGER.